June 9, 1964  L. C. FREDRICKSON  3,135,992
METHOD FOR PRODUCING SHELLED CRAB CLAWS
Original Filed Feb. 6, 1961  4 Sheets-Sheet 1

INVENTOR.
LLOYD C. FREDRICKSON
BY
ATTORNEYS

INVENTOR.
LLOYD C. FREDRICKSON

ATTORNEYS

June 9, 1964   L. C. FREDRICKSON   3,135,992
METHOD FOR PRODUCING SHELLED CRAB CLAWS
Original Filed Feb. 6, 1961   4 Sheets-Sheet 4
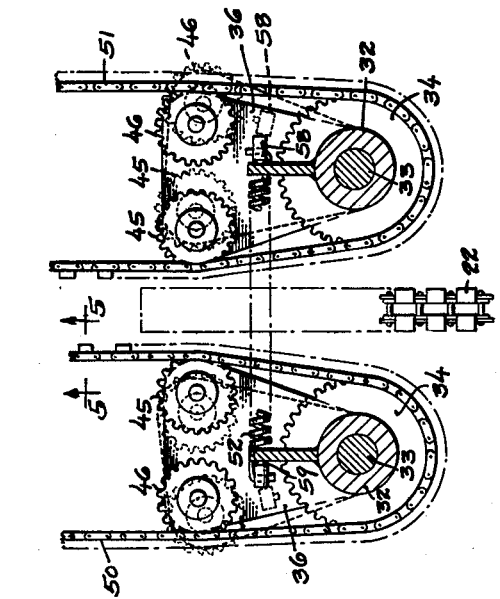
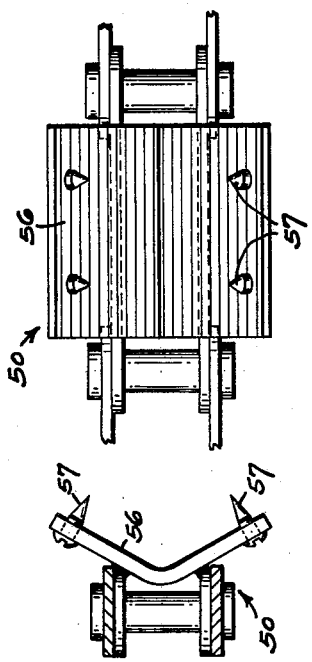
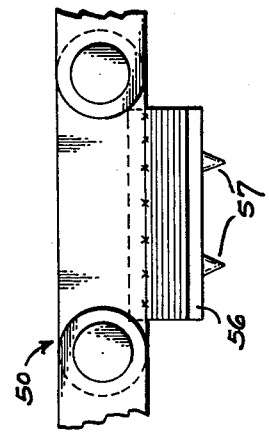
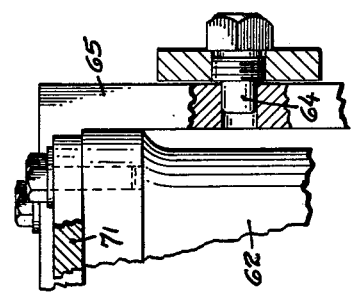
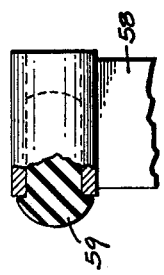
INVENTOR.
LLOYD C. FREDRICKSON
BY
ATTORNEYS

United States Patent Office 3,135,992
Patented June 9, 1964

3,135,992
METHOD FOR PRODUCING SHELLED CRAB CLAWS
Lloyd C. Fredrickson, Seattle, Wash., assignor to Wakefield Seafoods, Inc., Seattle, Wash., a corporation of Washington
Original application Feb. 6, 1961, Ser. No. 87,448. Divided and this application June 24, 1963, Ser. No. 290,888
2 Claims. (Cl. 17—45)

This invention relates to a method for shelling crab claws, particularly the claws of the crustacean commonly known as the king crab, having as its object to obtain a solid chunk of exposed meat from each individual claw, and namely those portions of the two arms of the crab which lie beyond the outermost joint. The present application is a division of my pending application filed Feb. 6, 1961, Ser. No. 87,448, now abandoned.

In a crab, each of its two claws is comprised of two jaws one of which, the dactyl, is made integral with and the other of which, the pollex, is hinged to a common root section commonly referred to as the bulb of the claw. In a king crab a large chunk of meat is contained within such bulb and is relished as a delicacy, particularly so when the chunk has been removed intact from its shell. This chunk of meat extends into the pollex and connects by tendons with the shell proper of the latter. It has little or no connection either with the shell of the bulb or with the shell of the dactyl. Where a cracking of the shell is resorted to as a means of obtaining the meat the meat frequently is crushed. Also, small fragments of the shell lodge in surface crevices. The present invention proposes to bisect the shell of the bulb by sawing through the same, then peeling the sawed segments of shell from the meat, leaving the meat completely exposed in a solid chunk with the pollex shell attached thereto. The latter, extending as a horn prolongation from an end of the meat chunk, serves as a handle by which the meat chunk can be held. As an hors d'oeuvre, the horn adds measurably to the sales value of the delicacy both from a utilitarian standpoint and its eye appeal.

Particular objects and advantages of the invention in addition to the general object hereinabove recited will appear and be understood in the course of the following description and claims, the invention consisting in the new method of shelling a crab claw hereinafter described and claimed.

In the accompanying drawings wherein I have illustrated a machine for performing the method:

FIG. 4 is a fragmentary enlarged-scale horizontal sectional view on line 4—4 of FIG. 1.

FIG. 5 is a transverse vertical sectional view drawn to an enlarged scale on line 5—5 of FIG. 4 to detail one of two travelling opposed jaw structures which produce a bucket conveyor employed in the machine.

FIGS. 6 and 7 are an elevational view and a top plan view, respectively, of one of said jaws.

FIG. 8 is a fragmentary detail transverse vertical sectional view drawn to an enlarged scale on line 8—8 of FIG. 3.

FIG. 9 is a horizontal enlarged-scale fragmentary view detailing trunnion mountings by which saw-driving electric motors are pivotally hung.

FIG. 10 is an elevational view portraying a crab claw as it appears before being fed into the machine and indicating by broken lines the plane along which the shell of the bulb portion is sawed as the claw traverses a bisecting station in course of being conveyed through the machine; and FIG. 11 is a larger scale elevational view of the product which the process of the present invention produces, broken lines in this instance portraying the shell segment to which the pollex portion of the claw is hinged and which is quickly and easily detached from the pollex, after sawing the shell, by bending the same backwardly toward the pollex.

Figure 1:
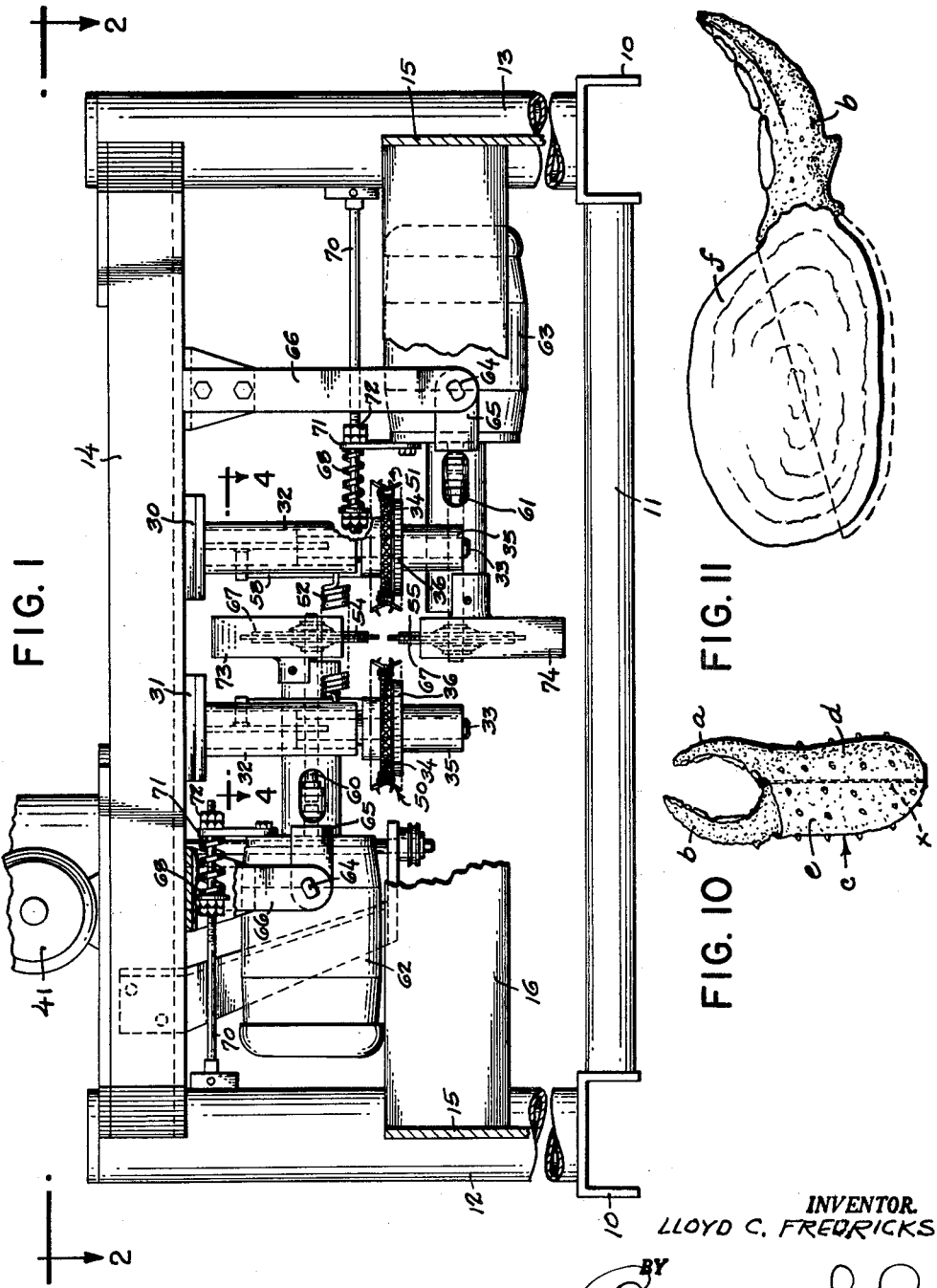
FIGURE 1 is a fragmentary transverse vertical sectional view of such machine.
Figure 2:
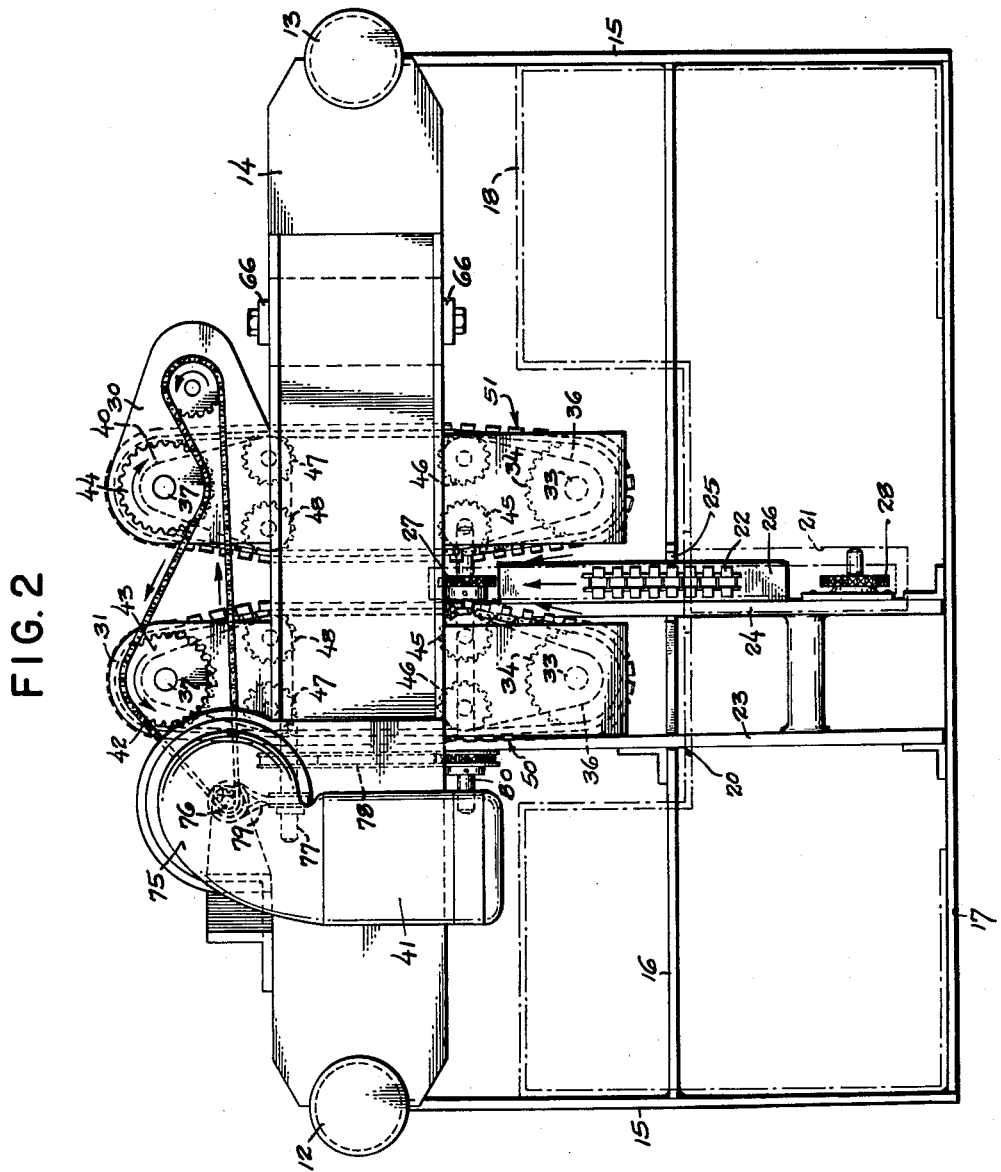
FIG. 2 is a top plan view thereof with the vantage point indicated by 2—2 in FIG. 1. Dash-and-dot lines in this view indicate a bin with which the machine is equipped and from which an operator selects claws and feeds the same into the machine.
Figure 3:
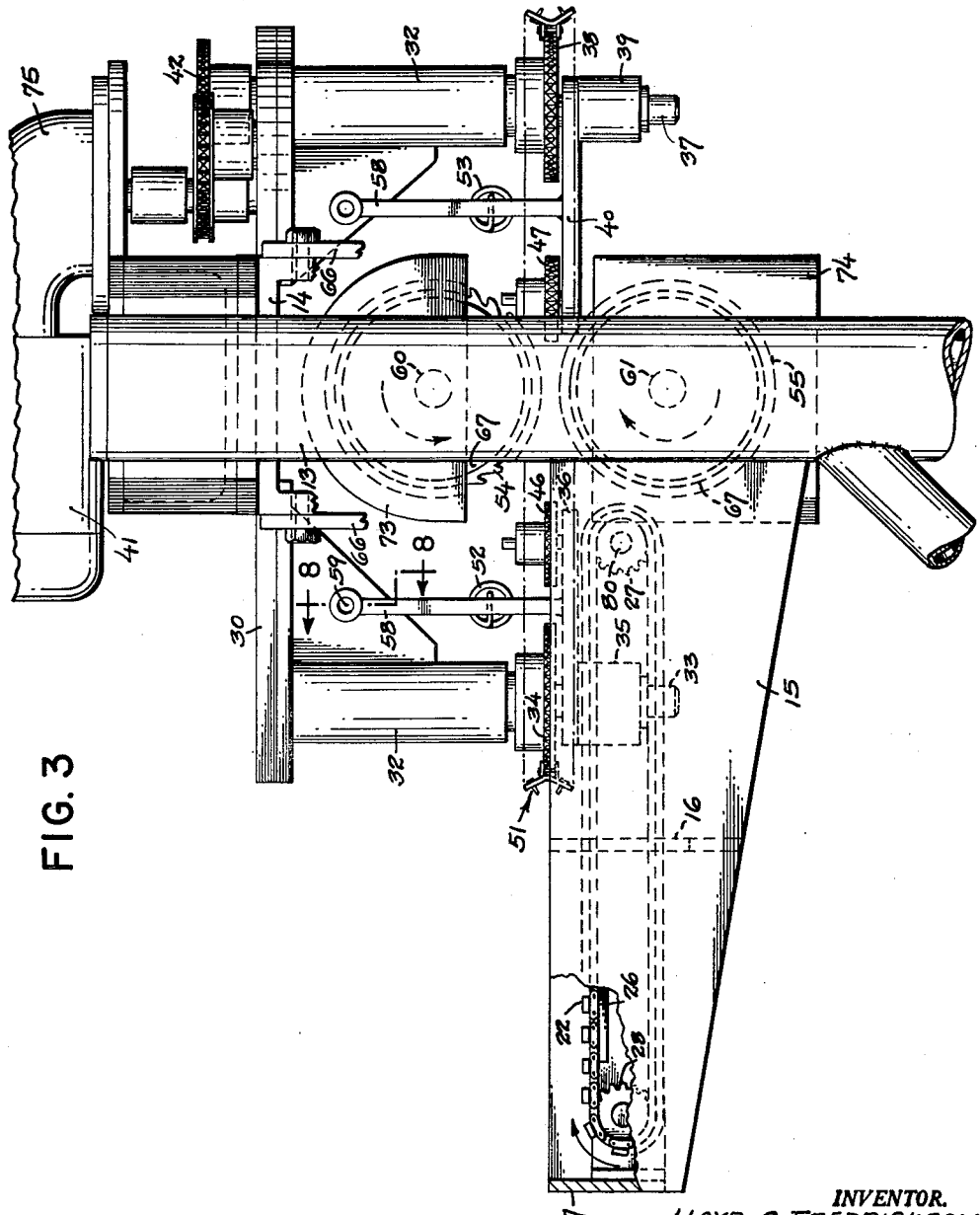
FIG. 3 is a fragmentary side elevational view drawn to an enlarged scale and with parts broken away and shown in section.

Referring to said drawings, the numeral 10 designates transverse channels and 11 longitudinal bars of a rectangular bed giving foundation support to longitudinally spaced apart vertical standards 12 and 13 of a machine frame. The head ends of the standards are tied together by an integral horizontal stringer 14. At or about the mid-height, outriggers 15 jut laterally from the posts. Spanner plates 16 and 17 extend between the outrigger arms and give support to a bin 18 which I have shown in outline in FIG. 2. The purpose of this bin is to hold a supply of the crab claws which are to be processed by the machine and is provided with a floor and an enclosing wall. The wall extends about the entire perimeter excepting for an opening 20 at the inside which registers with an open-end transversely disposed floor slot 21 located at substantially the mid-length of the bin. The receiving end of the horizontally disposed upper run of an endless infeed conveyor chain 22 occupies this floor slot. In order to accommodate this chain and the horizontal bars 23 and 24 of a frame structure which gives support to live and idler sprocket wheels 27 and 28, respectively, for said chain the inner spanner plate 16 is notched as at 25 (FIG. 2). Said upper run of the conveyor chain occupies a level moderately lower than the floor of the bin 18 and is sustained by a table 26 deriving support from the frame bar 24. While not detailed in the drawings it will be understood that the idler sprocket wheel is arranged for adjustment to take up chain slack.

Designated by 30 and 31 are two horizontal outrigger plates rigidly secured to the underside of the stringer 14 so as to extend by their ends fore and aft of the stringer, one at one side of the vertical plane occupied by the infeed conveyor and the other at the other side of said plane. A respective hanger 32 is fixed to each end of each of said outrigger plates providing in each instance a cylindrical muzzle positioned so as to locate its axis perpendicular to the plane occupied by the table 26, and receiving a thrust-and-journal bearing in each of these muzzles is a respective spindle. Denoted by 33, the forward spindles are idlers, have their lower ends exposed below the muzzles, and have a respective sprocket wheel 34 secured to such exposed end. Each such exposed end also carries a collar 35 spaced below the sprocket wheel, and in this space a respective triangular plate 36 is journaled for rocker motion about the center of the related spindle as an axis, bearing upon the related collar. Counterparts 37, 38, 39 and 40 of said spindles, sprocket wheels, collars, and plates, respectively, are associated with each of the rear muzzles but in this instance the spindles are live, being driven from above by an electric motor 41. For this purpose an endless drive chain 42 is trained about a set of sprocket wheels two of which, designated by 43 and 44, are fast to exposed upper ends of the two rear spindles 37. Considered from the vantage point of FIG. 2, and as can be clearly seen therefrom, the drive is such that the two sprocket wheels 43 and 44 turn in opposite directions, that of the former being counter-clockwise while the other turns in a clockwise direction.

Said triangular plates 36 and 40 lie co-planar to one another and extend rearwardly and forwardly, respectively, from their rocker axes, and upon the free inner ends each carries a pair of laterally spaced apart free-turning sprocket wheels occupying the same horizontal plane in which the sprocket wheels 34 and 38 lie. This horizontal plane is moderately above the upper or work-carrying surface of the infeed conveyor chain 22. In the instance of the plates 36 the free-turning sprocket wheels supported thereby are denoted by 45 and 46. For the plates 40 such free-turning sprocket wheels are denoted by 47 and 48. A respective endless conveyor chain, as 50 and 51, is trained about each of the two sets of said sprocket wheels 34, 38, 45, 46, 47 and 48. The facing runs of the two chains 50 and 51 are yieldingly urged directively toward one another by springs 52 and 53 extending transversely between respective posts 58 rigidly surmounting free ends of the rock-plates 36 and 40. These facing runs are arranged to grip the crab claws therebetween, and act in complement to produce a principal conveyor which receives the claws from the infeed conveyor and carries the same through a processing station. In their traversal of this station continuously driven circular saws 54 and 55 act from above and below to bisect the claw.

Best seen from an inspection of FIGS. 5, 6 and 7, the links of the chains which form said principal conveyor carry flights 56 which form a substantial V-shaped trough when viewed from the end. The trough faces outwardly relative to the chain and has its two wing sections inclined upwardly and downwardly, respectively, at a corresponding inclination from the horizontal, preferably on the order of 60°. Adjacent the outer extremity of each wing there is presented one or more claw-gripping spikes 57 directed inwardly perpendicular to the concerned wing.

It will, it is believed, have been apparent from the foregoing that the principal conveyor produces that which in effect is a succession of vise-like buckets travelling along a generally rectilineal path and in which the vise-jaws close upon the work at one end of the conveyor's rectilineal travel and open automatically as the conveyor reaches the other end of such travel. Rubber bumpers 59 carried by the posts 58 at the head ends thereof act as stops limiting the degree to which the plates 36 and 40 swing inwardly by imposition of yielding thrust from the springs 52 and 53.

Proceeding now to describe the saws, the same have independent arbors, as 60 and 61, and independent electrically driven motors, as 62 and 63, and are each trunnion-mounted so as to swing directively toward and from one another about longitudinal horizontal axes into and out of a co-planar position whereat both saws occupy substantially the longitudinal median line of the principal conveyor. The trunnion pins for the saws (see FIG. 9) are denoted by 64 and pivotally connect yokes 65, which are boltably attached to the motor housings, to hangers 66 depending from opposite sides of the frame stringer 14. Each of said saws 54 and 55 has a respective disc 67 overlying one face thereof, the purpose being to limit the depth to which the blade will cut as the two saws are yieldingly urged toward one another by force of springs 68. The springs are sleeved upon rods 70 which are pivoted to the machine frame and exert thrust against upstanding fingers 71 attached to the saw assemblies. Jam-nut combinations 72 provide adjustable stops presenting a limit of swing for the saws. Each saw is fitted with a guard, as 73 and 74.

Said drive to the bucket conveyor includes reduction gearing housed in a gear box 75. The motor for the bucket conveyor also drives the infeed conveyor, the power being passed by belt gearing 79 from vertical shaft 76 to a jack shaft 77 and thence by chain 78 to a shaft 80 for the live sprocket wheel 27, giving to the infeed conveyor a travelling speed the same as that of the bucket conveyor.

Tracing the method, claws which are to be processed are placed in the sorting bin 18, and are selected by hand therefrom and placed one at a time upon the infeed conveyor with the dactyl $a$ and the pollex $b$ of the claw extending in a generally longitudinal direction, one at one side and the other at the other side of the longitudinal median line of the conveyor. While the bulb portion $c$ of the claw may be in either a leading or trailing position relative to said jaw sections $a$ and $b$, the former condition is preferred. Upon reaching the entrance end of the principal conveyor the bulb becomes gripped by the spikes 57 and is carried thereby into engagement with the saws, the latter working along the top and bottom of the bulb portion to cut the shell along a line designated by $x$ in FIG. 10, the saws substantially following the contour of the bulb shell and penetrating the shell only to a depth dictated by the discs 67 so as not to cut into the crab meat. Upon its traversal of the saw station, the jaws of the conveyor buckets open and deposit the bisected claw upon a belt or other like lower-level conveyor (not shown) by which they are carried to a packing station. An operator stationed along the latter path of travel discards the bulb segment $d$ to which the dactyl is attached. There is little meat within the dactyl. The other shell segment $e$ of the bulb is disconnected from the pollex by bending the one backwardly upon the other so as to rupture the skin-like membrane which serves as a hinge and constitutes the only attachment between the two, leaving a solid chunk $f$ of exposed meat having a handle-like horn, namely the pollex $b$ attached thereto.

It is believed that the invention will have been clearly understood from the foregoing detailed description.

What I claim is:

1. The method of shelling a crab claw comprising bisecting the shell of the bulb portion of said claw throughout substantially the entire perimeter in a plane which extends longitudinally of the bulb on a median between the dactyl and pollex of the claw, separating the shell segment to which the pollex is hinged, and which contains the meat of the bulb portion, from the freed shell segment which is integral with the dactyl, and separating the former shell segment from the pollex by bending the former backwardly upon the pollex to break the hinge.

2. The method of shelling a crab claw comprising sawing through the shell of the bulb portion of said claw so as to bisect said bulb shell longitudinally and leave two separated shell segments one of which is integral with the dactyl of the claw and the other of which is hinged to the pollex of the claw, allowing the former segment to fall free, and separating the latter segment from the contained chunk of crab meat by bending the segment backwardly upon the pollex to break the hinge, the pollex remaining as an attached horn prolongation of the meat chunk.

References Cited in the file of this patent
UNITED STATES PATENTS
2,335,806    Sjostrom _____ Nov. 30, 1943